United States Patent
Yamada et al.

(10) Patent No.: US 7,026,368 B2
(45) Date of Patent: Apr. 11, 2006

(54) ULTRAVIOLET-CURABLE INK COMPOSITION FOR INK JET RECORDING

(75) Inventors: Yutaka Yamada, Saitama (JP); Hisao Yamaguchi, Ageo (JP); Osamu Oshima, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 61 days.

(21) Appl. No.: 10/627,866

(22) Filed: Jul. 28, 2003

(65) Prior Publication Data

US 2004/0024091 A1    Feb. 5, 2004

(30) Foreign Application Priority Data

Jul. 31, 2002    (JP) .............................. 2002-223306

(51) Int. Cl.
*C09D 11/10*    (2006.01)
*C08K 3/18*    (2006.01)

(52) U.S. Cl. ........................................ 522/83; 522/96
(58) Field of Classification Search .................. 522/75, 522/83, 84, 173, 96; 523/160, 161
See application file for complete search history.

(56) References Cited

U.S. PATENT DOCUMENTS

| | | | | |
|---|---|---|---|---|
| 5,034,508 A | * | 7/1991 | Nishizaki et al. ............ 528/408 |
| 5,385,960 A | * | 1/1995 | Emmons et al. ............. 523/205 |
| 5,954,866 A | * | 9/1999 | Ohta et al. ................. 106/31.89 |
| 6,080,449 A | * | 6/2000 | Kato et al. .................... 427/458 |
| 6,080,802 A | * | 6/2000 | Emmons et al. ............. 523/205 |

FOREIGN PATENT DOCUMENTS

| | | |
|---|---|---|
| EP | 0254187 | 1/1988 |
| EP | 1036831 A1 | 9/2000 |
| JP | 62-64874 | 3/1987 |
| JP | 2000-336295 | 12/2000 |
| JP | 2001-207098 | 7/2001 |
| WO | WO 02/46323 A2 | 6/2002 |

OTHER PUBLICATIONS

European Search Report dated Nov. 20, 2003.

* cited by examiner

*Primary Examiner*—Susan Berman
(74) *Attorney, Agent, or Firm*—Armstrong, Kratz, Quintos, Hanson & Brooks, LLP

(57) ABSTRACT

An ultraviolet-curable white ink composition for ink jet recording is provided which has good dispersibility and good redispersibility and has excellent ejection stability, and provides excellent visibility of printed matter having a base material which forms a black or dark background. In an ultraviolet-curable ink composition for ink jet recording comprising titanium oxide, a polymeric dispersant having a basic functional group, a photopolymerizable compound and a photopolymerization initiator, the titanium oxide is surface-treated with silica and alumina and the weight of the silica, which coexists with the titanium oxide, is larger than that of the alumina.

8 Claims, No Drawings

ULTRAVIOLET-CURABLE INK COMPOSITION FOR INK JET RECORDING

BACKGROUND OF THE INVENTION

1. Field of the Invention

The present invention relates to an ultraviolet-curable ink composition for ink jet recording and, more particularly, to an ultraviolet-curable ink composition for ink jet recording containing titanium oxide as a colorant, the composition having excellent ejection stability and providing excellent visibility of printed matter having a base material which forms a black or dark background.

2. Description of Related Art

In a printing method using an ink jet recording apparatus, ink is ejected from nozzles and deposited onto a recording material, and satisfactory printing can be performed on a curved surface or a surface having irregularities because the nozzles do not contact the recording material. Therefore, wide ranges of industrial applications are anticipated for this printing method.

Inks used in an ink jet recording system wherein a dye is used as a colorant includes, for example, water-based inks wherein water is used as a prime solvent, and oil-based inks wherein an organic solvent is used as a prime solvent. Among these inks, water-based inks prepared by dissolving a dye in an aqueous solvent are mainly used. However, when using a conventional water-based dye ink for industrial applications, there are problems, for example, slow drying rate of ink on a non-absorbing material, poor adhesion of printed images, and insufficient durability such as abrasion resistance, water resistance and light resistance. Inks proposed to solve these problems include, for example, water-based and oil-based inks for ultraviolet-curable ink jet recording wherein various color pigments are used as a colorant, said inks being cured and dried by irradiation with radiation such as ultraviolet light.

Among these inks, it has been proposed that inks used for white printing on a base material which forms a black or dark background consist of, for example, an ultraviolet-curable ink composition for ink jet recording wherein titanium oxide, which is a white pigment having excellent covering properties, coloring power, and chemical resistance, is used as a colorant. For example, Japanese Unexamined Patent Application, First Publication No. Sho 62-64874 proposes an ink for an ink jet printer of a continuous system wherein a thermoplastic resin is used as a dispersion medium of a pigment and rutile titanium oxide is used as a white pigment; Japanese Unexamined Patent Application, First Publication No. 2000-336295 proposes an ink wherein the dispersion stability and ejection stability are improved by using anatase titanium oxide; and Japanese Unexamined Patent Application, First Publication No. 2001-207098 proposes an ink wherein rutile titanium oxide and a pigment dispersant are used.

As described above, the titanium oxide is suited for use as a pigment for white ink because of its excellent covering properties and coloring power. However, titanium oxide is liable to cause precipitation of the pigment when an ink jet recording apparatus is stopped for a long period because of its large specific gravity. If the pigment has poor redispersibility, it precipitates in the ink supply path, and thus the ink becomes non-uniform, which causes changes in its physical properties and deteriorates the ejecting performance. Furthermore, the pigment precipitated in an ink supply tank agglomerates to form a hard cake and the original dispersion state cannot be recovered even if a redispersion operation is performed by stirring. Therefore, in order to obtain an ultraviolet curable white ink for ink jet recording which has excellent ejection stability and which provides excellent visibility of printed matter having a base material which forms a black or dark background, it is important to stably disperse the titanium oxide in a mixture containing a photopolymerizable compound without causing precipitation of the titanium oxide. If the titanium oxide is precipitated, it must be excellent in redispersibility of the precipitated titanium oxide. However, a conventional ultraviolet-curable ink composition for ink jet recording, wherein titanium oxide is used as a colorant, is not excellent in the characteristics involved in dispersion or redispersion of the titanium oxide, and is also insufficient in ejection stability.

BRIEF SUMMARY OF THE INVENTION

An object of the present invention is to provide an ultraviolet curable white ink composition for ink jet recording, which has good dispersibility and good redispersibility and has excellent ejection stability, and provides excellent visibility of printed matter having a base material which forms a black or dark background.

The present invention provides an ultraviolet-curable ink composition for ink jet recording, comprising titanium oxide, a polymeric dispersant having a basic functional group, a photopolymerizable compound and a photopolymerization initiator, wherein the titanium oxide is surface-treated with silica and alumina and the weight of the silica, which coexists with the titanium oxide, is larger than that of the alumina.

The ink composition for ink jet recording of the present invention can maintain the dispersion stabilizing effect, due to a steric hindrance repulsive force, over long periods because the titanium oxide is surface-treated with silica and alumina and the weight of the silica, which coexists with the titanium oxide, is larger than that of the alumina, and thus a polymeric dispersant having a basic functional group is strongly adsorbed through the surface treated with the silica on the titanium oxide.

The ultraviolet-curable ink composition for ink jet recording of the present invention is excellent in dispersibility, initial ejecting properties, precipitation resistance, redispersibility and covering properties and has good curability, and is also excellent in solvent resistance and abrasion resistance. Therefore, the ultraviolet-curable ink composition for ink jet recording of the present invention is suitable for use as an ultraviolet-curable ink composition for ink jet recording which can cover various printing materials which form a black or dark background.

DETAILED DESCRIPTION OF THE INVENTION

The photopolymerizable compound used in the present invention preferably contains a photopolymerizable compound which dissolves a polymeric dispersant.

When using a polymeric dispersant for improving the dispersibility of a pigment, a non-reactive diluting solvent capable of dissolving the polymeric dispersant is commonly used. However, the use of the non-reactive diluting solvent deteriorates the curability of an ultraviolet-curable ink composition for ink jet recording and deteriorates the durability of printed matter, for example, solvent resistance and abrasion resistance.

In order to obtain excellent durability based on good curability of printed matter as a feature of the ultraviolet curable ink as well as ejection stability, a non-water-based ultraviolet curable ink, which does not substantially contain a non-reactive solvent such as water or organic solvent, is preferably used and a pigmented-type ultraviolet-curable ink composition for ink jet recording, which does not contain any non-reactive diluting solvent, is more preferably used.

When the ultraviolet-curable ink composition for ink jet recording contains a photopolymerizable compound which dissolves the polymeric dispersant, it is not necessary to add a diluting solvent for dissolving the polymeric dispersant and thus it is made possible to satisfactorily maintain the curability and improve the durability of the cured coating film, for example, the solvent resistance and abrasion resistance. Since the ultraviolet-curable ink composition for ink jet recording does not substantially contain a non-reactive diluting solvent, the solvent does not remain on the printed matter, and the printed matter is free from solvent odors. Therefore, this is advantageous in terms of health and is also environmentally friendly.

The present invention will now be described in detail by way of the embodiments.

Various titanium oxides, which have different particle sizes and are surface-treated with various surface treating agents, are commercially available as a colorant for coating compositions, inks, and plastics, and an appropriate titanium oxide is selected according to the intended use.

The method of surface-treating the titanium oxide includes aqueous treatment and vapor phase treatment for improvement of the weatherability and dispersibility. More specifically, the aqueous treatment, for example, is performed by dry-grinding titanium oxide, then wet-grinding it by adding water and a dispersant thereto, adding to the mixture an aqueous solution of salts of metal for the surface treatment, and adding to the mixture an alkali or an acid to neutralize the solution, whereby the titanium oxide is coated with the hydrated oxide thus produced. As a common surface treating agent, alumina is often used to improve the wettability of the titanium oxide during dispersion, while silica is often used to improve the durability of the printed matter. Consequently, titanium oxides for a coating composition can be classified roughly into those which are not surface-treated, those which are surface-treated with alumina, and those which are surface-treated with alumina and silica.

In the present invention, the titanium oxide used, together with the polymeric dispersant having a basic functional group, is treated with alumina and silica, and the weight of the silica, which coexists with the titanium oxide, is larger than that of the alumina.

A titanium oxide which is surface-treated with alumina and silica, the weight of the silica used in the surface treatment being larger than that of the alumina, is commercially available from manufacturers of titanium oxide, for example, ISHIHARA SANGYO KAISHA, LTD. and TAYCA CORPORATION.

The weight of the silica, which coexists with the titanium oxide, and the weight of the alumina can be measured by fluorescent X-ray analysis. In addition to silica and alumina which are present on the surface of the titanium oxide, silica and alumina may be present as free particles around the titanium oxide, and the total weight of silica and the total weight of alumina can be measured by fluorescent X-ray analysis. As a quantitative method for fluorescent X-ray analysis, an analysis method based on a working curve using a standard sample has been established.

The titanium oxide is preferably used in an amount within a range from 5 to 30% by weight based on the total weight of the photopolymerizable compound. When the weight is less than 5% by weight, the covering properties of the printed coating film tend to become insufficient. On the other hand, when the weight exceeds 30% by weight, the durability of the printed coating film tends to become insufficient.

The particle size of the titanium oxide pigment is preferably from 100 to 500 nm. When the particle size of the pigment is less than 100 nm, the covering properties of the printed coating film tend to become insufficient. On the other hand, when the particle size exceeds 500 nm, the ejection stability tends to become insufficient.

The polymeric dispersant used in the present invention has a basic functional group, which serves as a group capable of being the adsorption sites for the pigment and the polymeric dispersant is strongly adsorbed by the alumina-silica-treated titanium oxide wherein the weight of the silica, which coexists with the titanium oxide, is larger than that of the alumina used in the present invention, and thus it can impart good dispersibility to the titanium oxide. Consequently, the titanium oxide does not readily precipitate, and even when the titanium oxide precipitates, it does not form, in the precipitation area, a hard cake which cannot be easily redispersed.

The reason why the polymeric dispersant having a basic functional group is strongly adsorbed by the titanium oxide when the weight of the silica, which coexists with the titanium oxide, is larger than that of the alumina is considered to be as follows. That is, the alumina is an amphoteric compound capable of forming a salt with an acid and a base, while the silica forms a salt with only a base and has strong acidity.

Examples of the basic functional group include primary, secondary, or tertiary amino groups, nitrogen-containing heterocycles such as pyridine, pyrimidine, or pyrazine. Specific examples thereof include, but are not limited to, AJISPER PB821, PB822 and PB817 manufactured by Ajinomoto Fine-Techno Co., Inc.; SOLSPERS 24000GR and 32000 manufactured by Avecia Ltd.; and DISPARLON DA-703-50, DA-705 and DA-725 manufactured by Kusumoto Chemicals, Ltd.

The amount of the polymeric dispersant is preferably within a range from 1 to 10% by weight, and particularly preferably from 3 to 6% by weight, based on the amount of the pigment. When the amount is too small, the dispersibility is liable to become insufficient, and when the amount is too large, the ejection stability is liable to deteriorate; which is not preferable. Since the adsorption sites for the pigment are not exposed when the polymeric dispersant is not dissolved, the polymeric dispersant is used together with a solvent which dissolves the polymeric dispersant.

The photopolymerizable compound used in the present invention is classified roughly into a radical polymerization type and a cation polymerization type according to the reaction mechanism, and both of known photopolymerizable compounds can widely been used.

As the radical polymerization type photopolymerizable compound in the present invention, for example, monofunctional (meth)acrylates and polyfunctional (meth)acrylates can be used alone, or two or more kinds can be used in combination.

Examples of the monofunctional (meth)acrylate, which can be used in the present invention, include (meth)acrylates such as methyl (meth)acrylate, ethyl (meth)acrylate, propyl (meth)acrylate, butyl (meth)acrylate, amyl (meth)acrylate, 2-ethylhexyl (meth)acrylate, octyl (meth)acrylate, nonyl (meth)acrylate, dodecyl (meth)acrylate, hexadecyl (meth)

acrylate, octadecyl (meth)acrylate, cyclohexyl (meth)acrylate, benzyl (meth)acrylate, methoxyethyl (meth)acrylate, butoxyethyl (meth)acrylate, phenoxyethyl (meth)acrylate, nonylphenoxyethyl (meth)acrylate, glycidyl (meth)acrylate, dimethylaminoethyl (meth)acrylate, diethylaminoethyl (meth)acrylate, isobornyl (meth)acrylate, dicyclopentanyl (meth)acrylate, dicyclopentenyl (meth)acrylate, and dicyclopentenyloxyethyl (meth)acrylate.

Examples of the polyfunctional (meth)acrylate include di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, polyethylene glycol, propylene glycol, dipropylene glycol, tripropylene glycol, and polypropylene glycol; di(meth)acrylate of tris(2-hydroxyethyl) isocyanurate; di(meth)acrylate of diol, which is obtained by adding 4 or more moles of ethylene oxide or propylene oxide to 1 mole of neopentyl glycol; di(meth)acrylate of diol, which is obtained by adding 2 moles of ethylene oxide or propylene oxide to 1 mole of bisphenol A; di- or tri(meth)acrylate of triol, which is obtained by adding 3 or more moles of ethylene oxide or propylene oxide to 1 mole of trimethylolpropane; di(meth)acrylate of diol, which is obtained by adding 4 or more moles of ethylene oxide or propylene oxide to 1 mole of bisphenol A; trimethylolpropane tri(meth)acrylate; pentaerythritol tri(meth)acrylate, poly (meth)acrylate of dipentaerythritol; ethylene oxide-modified phosphoric acid (meth)acrylate; and ethylene oxide-modified alkyl phosphoric acid (meth)acrylate.

Specific examples of typical cation polymerization type photopolymerizable compounds used in the present invention include epoxy compounds and vinyl ether compounds.

Specific examples of the epoxy compound include aliphatic epoxy compounds such as bisphenol A type epoxy compound, bisphenol F type epoxy compound, phenol novolak type epoxy compound, trimethylolpropane polyglycidyl ether, and neopentyl glycol diglycidyl ether; and alicyclic epoxy compounds such as CELOXIDE 2000, 3000 and 4000 manufactured by Daicel Chemical Industries, Ltd.

Specific examples of the vinyl ether compound include 2-hydroxyethyl vinyl ether, triethylene glycol vinyl monoether, tetraethylene glycol divinyl ether, and trimethylolpropane trivinyl ether.

The photopolymerizable compound used in the present invention preferably contains a photopolymerizable compound which dissolves a polymeric dispersant, and particularly preferably contains a photopolymerizable compound which can dissolve 30% by weight of a polymeric dispersant in order to obtain good dispersion stability. When the photopolymerizable compound contains such a photopolymerizable compound, it is not necessary to add a non-reactive diluting solvent for dissolving the polymeric dispersant and the curability and durability of the cured coating film may not be deteriorated.

Among the photopolymerizable compounds which dissolve the polymeric dispersant, specific examples of the radical polymerization type photopolymerizable compound include 2-hydroxy-3-phenoxypropyl (meth)acrylate, tetrafurfuryl (meth)acrylate, neopentyl glycol (meth)acrylate, 2-hydroxyethyl (meth)acrylate, and benzyl (meth)acrylate. Among these compounds, 2-hydroxy-3-phenoxypropyl acrylate is particularly preferable. For example, "BISCOAT #220" manufactured by Osaka Organic Chemical Industry, Ltd., "Epoxy Ester M-600A" manufactured by KYOEISHA CHEMICAL Co., LTD. and "ALLONIX M-5700" manufactured by Toa Gosei Chemical Industries Co., Ltd. are commercially available. In the present invention, acrylate and methacrylate are generically referred to as (meth)acrylate. The amount of the (meth)acrylate which dissolves these polymeric dispersants is preferably the same as or larger than the amount of the polymer dispersant in the ink.

As the cation polymerization type compound which dissolves the polymeric dispersant, a low-viscosity alicyclic epoxy compound is preferably used and specific examples thereof include Celoxide 3000.

The use of the non-reactive diluting solvent such as water or organic solvent deteriorates the curability of the printed matter and also deteriorates the durability such as abrasion resistance, water resistance, or solvent resistance. However, when using the photopolymerizable compound which dissolves the polymeric dispersant, it is made possible to prepare an ultraviolet-curable white ink composition for ink jet recording which does not substantially contain the non-reactive diluting solvent in the ink composition. Therefore, the solvent does not remain on the printed matter, and the printed matter is free from solvent odors, which is advantageous in terms of health and is also environmentally friendly.

In the present invention, the term "non-reactive" means non-photopolymerizable. Also the sentence "does not substantially contain the non-reactive organic solvent" means that the amount of the non-reactive organic solvent is by far smaller than the amount used as a diluting solvent of the polymeric dispersant, if it is present, and that the amount is smaller than an amount which may exert an adverse influence on the solvent resistance and abrasion resistance of the coating film and exert an adverse influence on the health and on the human body. Considering the usual amount of the polymeric dispersant and the amount of the non-reactive diluting solvent, the amount of the non-reactive organic solvent is preferably about 0.5% by weight or less, more preferably about 0.1% by weight or less, and most preferably about 0.01% by weight or less, based on the ink composition.

In the present invention, both a radical polymerization type photopolymerizable compound and a cationic polymerizable compound can be used as the photopolymerizable compound.

However, to obtain an ink having high curing/drying rate at low viscosity, it is preferable to use (meth)acrylate, which is a radical polymerization type compound, as the photopolymerizable compound.

To impart excellent curability and durability of the cured coating film to the ink composition of the present invention, the ultraviolet-curable composition comprising a radical polymerization type photopolymerizable compound preferably contains polyurethane (meth)acrylate. The reason why the ultraviolet-curable composition containing polyurethane (meth)acrylate exhibits good curability is considered to be as follows. That is, since there is a urethane bond in the vicinity of a terminal double bond of polyurethane (meth)acrylate as compared with a terminal double bond of common (meth)acrylate, the terminal double bond of polyurethane (meth)acrylate is liable to be cleaved. It is also considered that the abrasion resistance is improved because of the characteristics of polyurethane.

It is preferable that the polyurethane (meth)acrylate used for the ink jet has a low viscosity, or that a low viscosity can be easily achieved by dilution with (meth)acrylate if the polyurethane (meth)acrylate itself has a high viscosity because of its crystallinity. To achieve low viscosity, polyurethane (meth)acrylate obtained by reacting polyisocyanate with monohydroxy (meth)acrylate is preferably used without using a polyol such as a long chain polyether or polyester.

The polyurethane (meth)acrylate is preferably used in an amount within a range from 3 to 15% based on the total amount of the ultraviolet-curable composition in view of the viscosity, curability, solvent resistance and abrasion resistance of the jet ink composition.

Any photoradical polymerization initiator can be used in the present invention provided that the ultraviolet-curable compound can be cured. As the photopolymerization initiator, a molecular cleavage type or hydrogen abstraction type photopolymerization initiator is preferably used in the present invention.

As the molecular cleavage type photoradical polymerization initiator in the present invention, there can be preferably used benzoin isobutyl ether, 2,4-diethylthioxanthone, 2-isopropylthioxanthone, benzyl, 2,4,6-trimethylbenzoyldiphenyl phosphine oxide-6-trimethylbenzoyldiphenyl phosphine oxide, 2-benzyl-2-dimethylamino-1-(4-morpholinophenyl)-butan-1-one, and bis(2,6-dimethoxybenzoyl)-2,4,4-trimethylpentyl phosphine oxide. Also, 1-hydroxycyclohexyl phenyl ketone, benzoinethyl ether, benzyl dimethyl ketal, 2-hydroxy-2-methyl-1-phenylpropan-1-one, 1-(4-isopropylphenyl)-2-hydroxy-2-methylpropan-1-one, and 2-methyl-1-(4-methylthiophenyl)-2-morpholinopropan-1-one may be used in combination with the above-described molecular cleavage type photoradical polymerization initiators. Furthermore, hydrogen abstraction type photopolymerization initiators such as benzophenone, 4-phenylbenzophenone, isophthalphenone, and 4-benzoyl-4'-methyl-diphenyl sulfide may be used. Also a molecular cleavage type photopolymerization initiator and a hydrogen abstraction type photopolymerization initiator can be used in combination.

The photoradical polymerization initiator can be used in combination with sensitizers, for example, amines, which do not undergo an addition reaction with the above-described polymerizable component, such as trimethylamine, methyldimethanolamine, triethanolamine, p-diethylaminoacetophenone, ethyl p-dimethylaminobenzoate, amyl p-dimethylaminobenzoate, N,N-dimethylbenzylamine, and 4,4'-bis(diethylamino)benzophenone. As a matter of course, it is preferable to use a photopolymerization initiator and sensitizer which have excellent solubility in the ultraviolet-curable compound and do not hinder ultraviolet light transmission.

The photoradical polymerization initiator and the sensitizer are preferably used in an amount within a range from 0.1 to 20% by weight, and preferably from 4 to 12% by weight, based on the total amount of the ultraviolet-curable composition.

Any photocationic polymerization initiator can be used in the present invention provided that the ultraviolet-curable compound can be cured. Specific examples thereof include polyaryl sulfonium salts such as triphenylsulfonium hexafluoroantimonate and triphenylsulfonium hexafluorophosphate; and polyaryliodonium salts such as diphenyliodonium hexafluoroantimonate and p-nonylphenyliodonium hexafluoroantimonate. Two or more kinds of these photocationic polymerization initiators can be used in combination.

The photocationic polymerization initiator is used in an amount within a range from 0.1 to 20% by weight, and preferably from 1 to 10% by weight, based on the ultraviolet-curable composition.

To the ink composition of the present invention, resins and additives can also be added for the purpose of controlling surface tension and imparting adhesion to the printed material.

The ultraviolet-curable ink composition for ink jet recording of the present invention can be prepared by mixing titanium oxide, a polymeric dispersant, a photopolymerizable compound such as (meth)acrylate and, if necessary, a resin to obtain a mixture, dispersing a pigment into the mixture using a conventional disperser such as a bead mill, adding additives such as a photopolymerization initiator and surface tension adjustor, and dissolving the additives while stirring. Also the ultraviolet-curable ink composition for ink jet recording can be prepared by preparing in advance a mill base as a high-concentration pigment dispersion using a conventional disperser such as a bead mill and adding a photopolymerizable compound (for example, (meth)acrylate) containing a photopolymerization initiator dissolved therein, and additives, followed by mixing while stirring.

EXAMPLES

The present invention will now be described in detail by way of Examples, but the scope of the present invention is not limited to the Examples. In the following Examples, parts are by weight unless otherwise specified.

Polyurethane (meth)acrylate Synthesis Example

In a 1 L four-necked flask equipped with a stirrer, a thermometer, condenser and a dropping funnel, 606.7 g of caprolactone-modified hydroxyethyl acrylate (PRACSEL FA-1, manufactured by Daicel Chemical Industries, Ltd.) is charged and 227.7 g of tolylene diisocyanate is added dropwise from a dropping funnel while stirring, taking care that the temperature of the reaction solution does not exceed 70° C. After the completion of the dropwise addition, stirring is continued while maintaining the temperature of the reaction solution at about 70° C. After one hour, 0.1 g of dibutyltin dilaurate is added and stirring is further continued. After about 10 hours, the reaction product is taken out after confirming that the unreacted isocyanate group is absent.

Mill Base Preparation Examples

Mill Base Preparation Example 1

50 Parts of JR-806 (titanium oxide having a silica content of 3% by weight, an alumina content of 1% by weight and an average particle size of 270 nm, manufactured by Tayca Corporation,) 2.5 parts of SOLSPERS 24000GR (dispersant, manufactured by Avecia Ltd.), 7.5 parts of ALLONIX M5700 (manufactured by Toa Gosei Chemical Industries Co., Ltd.), 35.2 parts of ethylene oxide-added 1,6-hexanediol diacrylate and 4.8 parts of 3-methoxybutyl acrylate were mixed while stirring using a stirrer for one hour, and then the mixture was treated using a bead mill for 4 hours to prepare a mill base.

Mill Base Preparation Example 2

In the same manner as in Mill Base Preparation Example 1, except that JR-805 (titanium oxide having a silica content of 3% by weight, an alumina content of 1.3% by weight and an average particle size of 270 nm, manufactured by Tayca Corporation) was used in place of JR-806 used in Mill Base Preparation Example 1, a mill base was prepared.

Comparative Mill Base Preparation Example 1

In the same manner as in Mill Base Preparation Example 1, except that JR-701 (titanium oxide having a silica content of 0.5% by weight, an alumina content of 0.9% by weight and an average particle size of 270 nm, manufactured by Tayca Corporation) was used in place of JR-805 used in Mill Base Preparation Example 1, a mill base was prepared.

Comparative Mill Base Preparation Example 2

In the same manner as in Mill Base Preparation Example 1, except that JR-600A (titanium oxide having an average particle size 250 nm subjected to only an alumina surface treatment, manufactured by Tayca Corporation) was used in place of JR-805 used in Mill Base Preparation Example 1, a mill base was prepared.

Comparative Mill Base Preparation Example 3

50 Parts of JR-701 (titanium oxide having a silica content of 0.5% by weight, an alumina content of 0.9% by weight and an average particle size of 270 nm, manufactured by Tayca Corporation), 2.5 parts of DISPERBYK-111 (polymeric dispersant having an acidic functional group, manufactured by BYK-Chemie Co.), 42.7 parts of ethylene oxide-added 1,6-hexanediol diacrylate and 4.8 parts of 3-methoxybutyl acrylate were mixed while stirring using a stirrer for one hour, and then the mixture was treated using a bead mill for 4 hours to prepare a mill base.

Comparative Mill Base Preparation Example 4

In the same manner as in Mill Base Preparation Example 3, except that JR-806 (titanium oxide having a silica content of 3% by weight, an alumina content of 1% by weight and an average particle size of 270 nm, manufactured by Tayca Corporation) was used in place of JR-701 used in Comparative Mill Base Preparation Example 3, a mill base was prepared.

Preparation Example of Ink

Example 1

To a solution prepared by adding 3.0 parts of IRGACURE 819 (manufactured by Ciba Specialty Chemicals Co.) as a photopolymerization initiator and 3.0 parts of RUCILIN TPO (manufactured by BASF Co.) to 5.0 parts of polyurethane acrylate of Synthesis Example, 10.0 parts of ethylene oxide-added trimethylolpropane triacrylate, 33.0 parts of ethylene oxide-added 1,6-hexanediol diacrylate, 12.0 parts of 3-methoxybutyl acrylate and 0.1 parts of DC57 ADDITIVE (polyether-modified silicone oil, manufactured by Dow Corning Co.) and dissolving the photopolymerization initiator while heating at 60° C., 40 parts of the mill base of Mill Base Preparation Example 1 was added and, after sufficient mixing, the mixture was filtered through a membrane filter having an opening diameter of 4.5 pm to prepare ink for an ink jet printer.

Example 2

In the same manner as in Example 1, except that the mill base of Mill Base Preparation Example 2 was used in place of the mill base of Mill Base Preparation Example 1 used in Example 1, ink for an ink jet printer was prepared.

Comparative Example 1

In the same manner as in Example 1, except that the mill base of Comparative Mill Base Preparation Example 1 was used in place of the mill base of Mill Base Preparation Example 1 used in Example 1, ink for an ink jet printer was prepared.

Comparative Example 2

In the same manner as in Example 1, except that the mill base of Comparative Mill Base Preparation Example 2 was used in place of the mill base of Mill Base Preparation Example 1 used in Example 1, ink for an ink jet printer was prepared.

Comparative Example 3

In the same manner as in Example 1, except that the mill base of Comparative Mill Base Preparation Example 3 was used in place of the mill base of Mill Base Preparation Example 1 used in Example 1, ink for an ink jet printer was prepared.

Comparative Example 4

In the same manner as in Example 1, except that the mill base of Comparative Mill Base Preparation Example 4 was used in place of the mill base of Mill Base Preparation Example 1 used in Example 1, ink for an ink jet printer was prepared.

Dispersibility, precipitability, redispersibility, covering properties, ejecting properties and curability of inks of Examples 1 and 2 and Comparative Examples 1, 2, 3 and 4 were evaluated in the following manners. The results are shown in Table 1.

Dispersibility

Using a MICROTRAC particle size analyzer (manufactured by Leeds and Northrup), the pigment particle size (volume average particle size) of ink was measured.

Precipitability

After the pigment was allowed to stand in a 20 ml glass container at room temperature for one month, the precipitation state was visually observed. The results were evaluated by the following criteria.
  A: not precipitated
  B: slight precipitates
  C: precipitates appear in one or two days Redispersibility Precipitates were formed in advance under conditions of storing at a temperature of 60° C. for one month in an accelerated test. Using the precipitates as the precipitation evaluation samples, redispersibility of the pigment was visually evaluated after shaking by hand (ten times). The results were evaluated by the following criteria.
  A: returned to the original state by redispersion
  B: no hard cake is formed, merely returned to an incomplete dispersion state
  C: precipitates form a hard cake and are not redispersed Covering Properties Using a bar coater, a coating film having a thickness of 5 to 8 µm was formed on a PET film. The coated film was placed on a black plate and the covering properties of the coating film after ultraviolet curing were visually observed. The results were evaluated by the following criteria.

A: completely covered
B: slightly affected by color of the base material
C: affected by the color of the base material Initial Ejecting Properties Printing was performed using an ink jet printer with a piezo type head whose head temperature was maintained at 45° C. and the printed state of printed matter was visually observed. The results were evaluated by the following criteria.

A: ejected at a predetermined position
C: some defects caused by poor ejection

Curability: Evaluation by Rubbing with Methanol

A PET film was coated using a bar coater and irradiated with ultraviolet light from a metal halide lamp of 120 W/cm at 0.5 J/cm2 using a conveyor type UV irradiation device, and then the cured state of the printed coating film was evaluated by rubbing with methanol.

Evaluation by rubbing with methanol: The printed matter was rubbed from side to side while pressing a cotton swab impregnated with methanol against the surface thereof and the number of rubs required to cause delamination or thick reduction of the printed coating film was measured. A number of rubs of 10 or more shows sufficient curability.

TABLE 1

| | Dispersibility | | Ejection stability | | | |
|---|---|---|---|---|---|---|
| | Average particle size | Initial ejecting properties | Precipitation resistance | Redispersibility | Covering properties | Curability |
| Example 1 | 360 nm | A | A | A | A | 10 or more times |
| Example 2 | 330 nm | A | A | A | A | 10 or more times |
| Comparative Example 1 | 530 nm | C | C | B | C | 10 or more times |
| Comparative Example 2 | 640 nm | B | C | B | C | 10 or more times |
| Comparative Example 3 | 297 nm | A | B | B | A | 10 or more times |
| Comparative Example 4 | 942 nm | C | C | C | B | 10 or more times |

As described above, the inks of Examples 1 and 2 which employ titanium oxide wherein the weight of silica, which coexists with the titanium oxide, is larger than that of alumina, and a polymeric dispersant having a basic functional group are excellent in dispersibility, precipitability, redispersibility, covering properties, initial ejecting properties, solvent resistance and abrasion resistance, whereas the ink of Comparative Example 1 which employs titanium oxide wherein the weight of alumina, which coexists with the titanium oxide, is larger than that of silica, and the ink of Comparative Example 2 which employs titanium oxide surface-treated with alumina were insufficient in dispersibility, precipitability, redispersibility, covering properties and initial ejecting properties.

Furthermore, when using a polymeric dispersant having an acidic functional group, the resulting ink was inferior in ejection stability to inks of Examples 1 and 2 even when using titanium oxide wherein the weight of one of alumina or silica is larger than that of the other one, as shown in Comparative Examples 3 and 4.

What is claimed is:

1. An ultraviolet-curable ink composition for ink jet recording, comprising titanium oxide, a polymeric dispersant having a basic functional group, a photopolymerizable compound and a photopolymerization initiator, wherein the titanium oxide is surface-treated with silica and alumina and the weight of the silica, which coexists with the titanium oxide, is larger than that of the alumina.

2. The ultraviolet-curable ink composition for ink jet recording according to claim 1, wherein the weight of the silica, which coexists with the titanium oxide, accounts for 2% by weight or more of the weight of the titanium oxide.

3. The ultraviolet-curable ink composition for ink jet recording according to claim 1 or 2, which contains a photopolymerizable compound which dissolves the polymeric dispersant.

4. The ultraviolet-curable ink composition for ink jet recording according to claim 3, wherein the photopolymerizable compound is a (meth)acrylate.

5. The ultraviolet-curable ink composition for ink jet recording according to claim 4, wherein the photopolymerizable compound is 2-hydroxy-3-phenoxypropyl acrylate as the (meth)acrylate.

6. The ultraviolet-curable ink composition for ink jet recording according to claim 3, which does not substantially contain a non-reactive organic solvent.

7. The ultraviolet-curable ink composition for ink jet recording according to claim 6, which contains polyurethane (meth)acrylate.

8. The ultraviolet-curable ink composition for ink jet recording according to claim 7, wherein the polyurethane (meth)acrylate is polyurethane (meth)acrylate synthesized from polyisocyanate and hydroxy (meth)acrylate.

* * * * *